US012754461B2

(12) United States Patent
Glanzrock

(10) Patent No.: US 12,754,461 B2
(45) Date of Patent: Oct. 6, 2026

(54) ACTION CAMERA CASE

(71) Applicant: Ulysses Glanzrock, Bainbridge Island, WA (US)

(72) Inventor: Ulysses Glanzrock, Bainbridge Island, WA (US)

( * ) Notice: Subject to any disclaimer, the term of this patent is extended or adjusted under 35 U.S.C. 154(b) by 203 days.

(21) Appl. No.: 18/763,523

(22) Filed: Jul. 3, 2024

(65) Prior Publication Data

US 2025/0020980 A1 Jan. 16, 2025

Related U.S. Application Data

(60) Provisional application No. 63/526,120, filed on Jul. 11, 2023.

(51) Int. Cl.

*G03B 17/14* (2021.01)
*G02B 7/02* (2021.01)
*G03B 17/56* (2021.01)

(52) U.S. Cl.

CPC ............. *G03B 17/14* (2013.01); *G02B 7/023* (2013.01); *G03B 17/565* (2013.01); *G03B 17/566* (2013.01); *G03B 2217/002* (2013.01)

(58) Field of Classification Search

CPC .................... G03B 11/00-06; G03B 17/12-14
See application file for complete search history.

(56) References Cited

U.S. PATENT DOCUMENTS

| | | | | | |
|---|---|---|---|---|---|
| 4,687,312 | A * | 8/1987 | Navarro | G03B 17/12 396/534 |
| 5,528,328 | A * | 6/1996 | O'Farrill | G03B 11/00 396/544 |
| 8,014,656 | B2 * | 9/2011 | Woodman | B63B 32/70 396/419 |
| 10,631,621 | B2 * | 4/2020 | Gregory | A45F 5/00 |
| 11,599,008 | B2 * | 3/2023 | Zeng | G03B 11/045 |
| 11,786,025 | B2 * | 10/2023 | Druker | A45C 11/22 396/27 |
| 2018/0352927 | A1 * | 12/2018 | Wang | G03B 17/08 |

OTHER PUBLICATIONS amazon.com, "PolarPro—Shutter Collection—Filters for GoPro Hero 8*-ND8-ND16-ND32—Neutral Density Filters—Ideal for mid-Day or Bright environments—CinemaSeries", https://www.amazon.com/PolarPro-Filter-3-Pack-Shutter-Collection, Oct. 11, 2024, 10 pages.

(Continued)

*Primary Examiner* — Leon W Rhodes, Jr.
(74) *Attorney, Agent, or Firm* — Powell IP Law, PLLC

(57) ABSTRACT

According to aspects of the disclosed subject matter, a camera case for an action camera is presented. In accordance with aspects of the disclosed subject matter each camera case includes a removable front flap that serves as a sun shield, and further provides protection of key elements of the action camera, including the action camera's lens. A filter tray is formed on the front surface of the action camera with a lens window coinciding with the location of the action camera's lens. The filter tray permits one or more filter plates to be inserted, with each filter plate including a pane corresponding to the area of the action camera's lens.

20 Claims, 7 Drawing Sheets

(56) References Cited

OTHER PUBLICATIONS

ULANZI.com, "Ulanzi G9-4 Plastic Cage for GoPro 9/10/11/12/13", https://www.ulanzi.com/products/ulanzi-g9-4-plastic-cage-for-gopro-9-10-11-12?, Oct. 11, 2024, 11 pages.
amazon.com, "SmallRig Mini Matte Box Lite, DSLR Matte Box with Carbon Fiber Top Flag, for 67mm/72mm/77mm/82mm/95mm Lenses, for 4×5.65 Filter/Circular Filter-3575", https://www.amazon.com/SmallRig-Mirrorless-Cameras-Compatible-Lenses/dp/B09NZM4SGK?source=ps-sl-shoppingads-lpcontext&ref_=fplfs&psc=1&smid=A22PRX6WI8E2K6, Oct. 11, 2024, 13 pages.

* cited by examiner

ACTION CAMERA CASE

REFERENCE TO RELATED APPLICATIONS

This application claims priority to U.S. Provisional Patent Application No. 63/526,120, entitled "Action Camera Case Using Multiple Filter and Anti-Light Glare Systems," filed Jul. 19, 2023, the entirety of which is incorporated herein by reference.

BACKGROUND OF THE INVENTION

A growing section of the camera industry is the "in-the-moment" camera, referred to hereafter as an action camera, which is simple to use, can capture videos and images at a high resolution, and is particularly designed to capture action and adventure moments. Often, these action cameras are small and light, built to be waterproof, and somewhat durable. Ubiquitously, action cameras are designed such that they incorporate a single lens, which an integrated lens.

While the typical action camera is designed to be durable, they are not impervious to scratches (particularly devastating when the lens is scratched), dents, and even breakage when dropped, struck against a hard object, or simply thrown in baggage for transport. Accordingly, owners of action cameras typically add a measure of protection by placing them in a camera case. As will be readily appreciated, a camera case adds an additional measure of protection for the action camera, often without interfering with the features offered by the camera. Unfortunately, encasing an action camera in a camera case limits the ability of the user to accessorize the camera, for example add filters and effect lenses, and/or mount lens shades to the camera.

SUMMARY OF THE INVENTION

According to aspects of the disclosed subject matter, a camera case for an action camera is presented. Indeed, while each camera case is particularly formed according to the dimensions of a corresponding action camera, in accordance with aspects of the disclosed subject matter each camera case includes a removable front flap that serves as a sun shield, and further provides protection of key elements of the action camera, including the action camera's lens. The front flap is adjustable to various positions as a sun shield/shade by an accessory hinge incorporated into the camera case. In addition to the front flap, the accessory hinge accepts a single attachment/accessory via a post that is inserted through a channel of the accessory hinge. A securing element 124, such as a mechanical screw or lever, ensures (typically though not exclusively by impingement/friction) that an attached accessory does not disengage from the accessory hinge until intentionally released by the user, and further secures a position of the accessory (e.g., the top flap) in relation to the camera case.

According to additional aspects of the disclosed subject matter, the front surface of the camera case includes a filter tray that allows one or more lens filters and/or effect lenses to be placed over the camera lens (or a camera lens cover that is typically integrated within the action camera.) According to various embodiments of the disclosed subject matter, each filter plate is configured to reside within the dimensions of the filter tray, and the filter or action lens of each filter plate is concentrically aligned and positioned with the lens of the action camera within the camera case.

In various embodiments, filter plates are secured to the camera case within the filter tray by one or more magnets. Typically, though not exclusively, the camera case includes a magnet in the filter tray above the camera lens and another magnet below the camera lens. Correspondingly, each filter plate includes a similar number of magnets, each magnet of the filter plate aligned with a magnet in the camera case, and each magnet is arranged such that the magnetic poles of the filter plate magnets have a strong magnetic attraction with the corresponding magnets in the camera case. In addition to the magnetic attraction between magnets in the camera case and filter plates, the dimensions of the filter tray further assure secure placement of the filter plates and protect them from being accidentally sheared off from the camera case. The depth of the filter tray (from the front of the camera case) is such that at least two filter plates may be stacked within the filter tray without exposing a filter plate above the front surface of the camera case. Due to the arrangement of the magnets and their magnetic poles, filter trays are stacked on another filter tray and are held in place by magnetic attraction.

With many action cameras, the action camera's lens cover is simply a clear cover that is often replaced by a polarized filter lens cover, which can be rotated in relation to the camera lens for specific effects. As those skilled in the art will appreciate, rotating a polarized lens cover often affects the amount of light that passes through the filter and camera lens combination to an internal sensor (or sensors) of the action camera, such as but not limited to a CMOS sensor. As those skilled in the art will appreciate, current camera cases inhibit, even prevent, the user from rotating that camera lens cover. However, according to various embodiments of the disclosed subject matter, the camera case of the present invention includes a wheel that can be positioned to engage with the camera lens cover to facilitate its rotation. Further, the wheel may also be disengaged from the camera lens cover so that unwanted camera lens cover rotation is avoided.

BRIEF DESCRIPTION OF THE FIGURES

The foregoing aspects and many of the attendant advantages of the disclosed subject matter will become more readily appreciated as they are better understood by reference to the following description when taken in conjunction with the following drawings, wherein.

DETAILED DESCRIPTION

To more fully set forth aspects of the camera case, reference is made to FIGS. 1A through 1E. As indicated above, these figures illustrate various views of a camera case 100 with a protective front flap 102 attached via an accessory hinge 104, all formed in accordance with aspects of the disclosed subject matter. The camera case is formed to closely accommodate a corresponding action camera. According to aspects of the disclosed subject matter, closely accommodating an action camera means that the action camera, when inserted into the camera case and the retaining door is shut, the action camera is unable to move within the camera case, except to be withdrawn from the camera case when the retaining door is opened for camera removal.

Figure 1A:
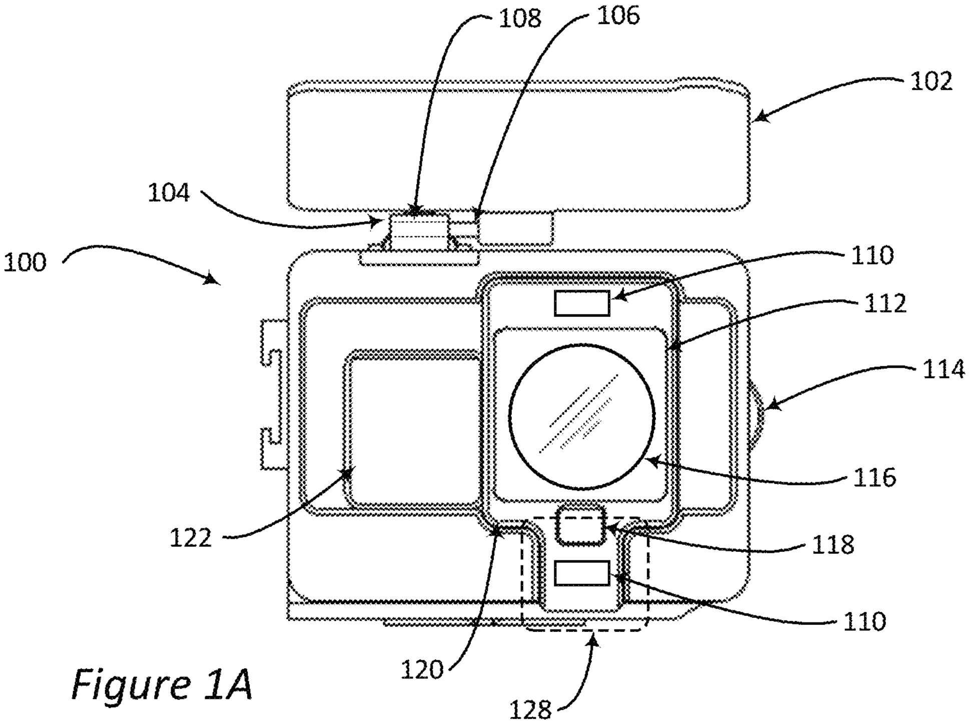
FIGS. 1A-1F are various illustrations of a camera case, or a portion thereof, formed in accordance with aspects of the disclosed subject matter.
Figure 1B:
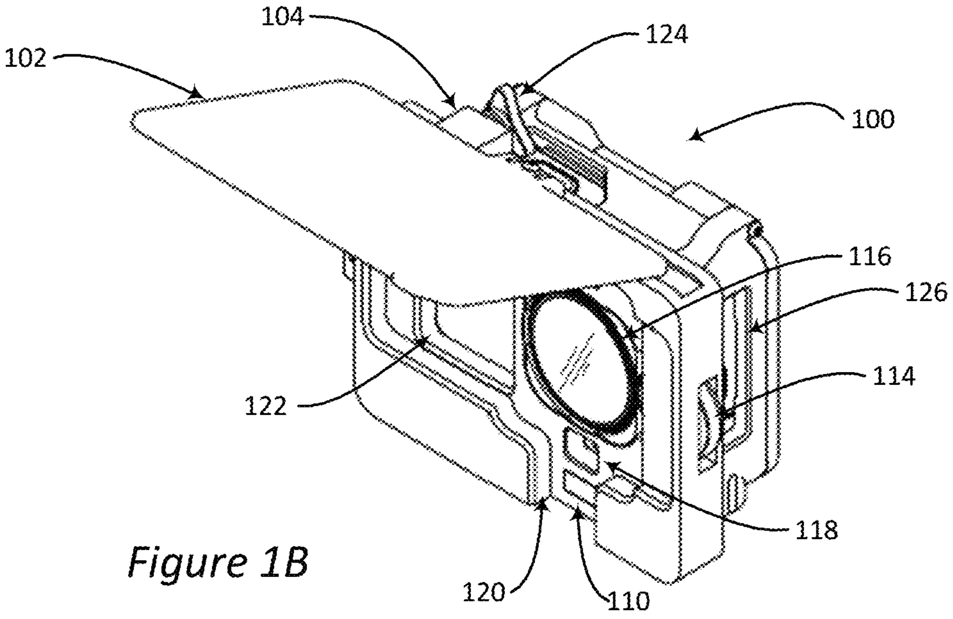
Figure 1C:
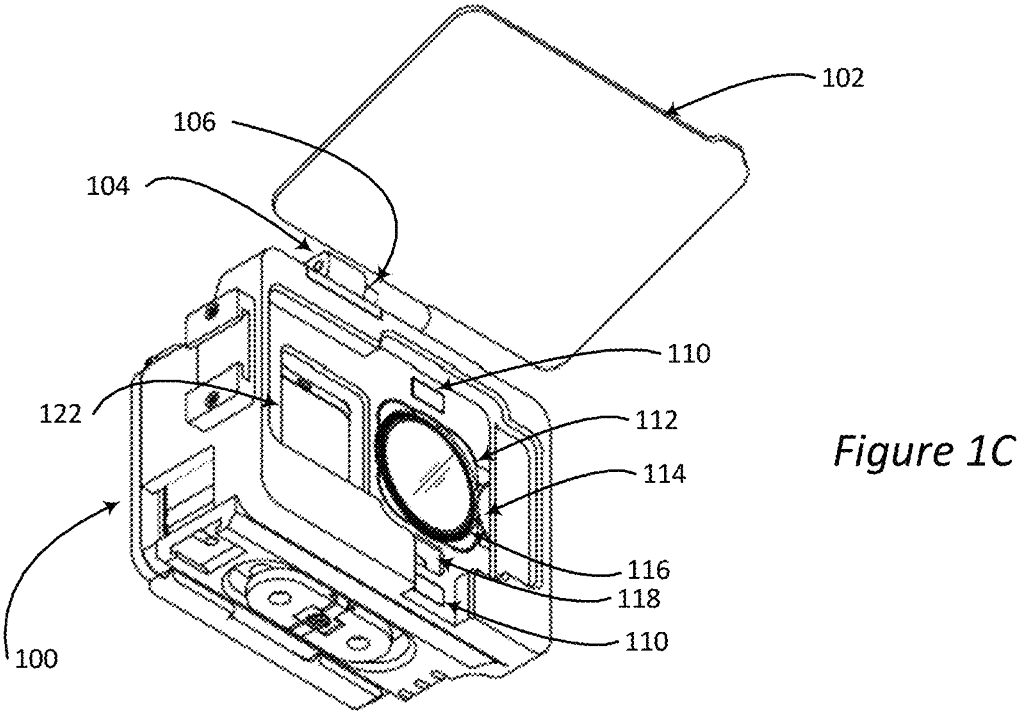
Figure 1D:
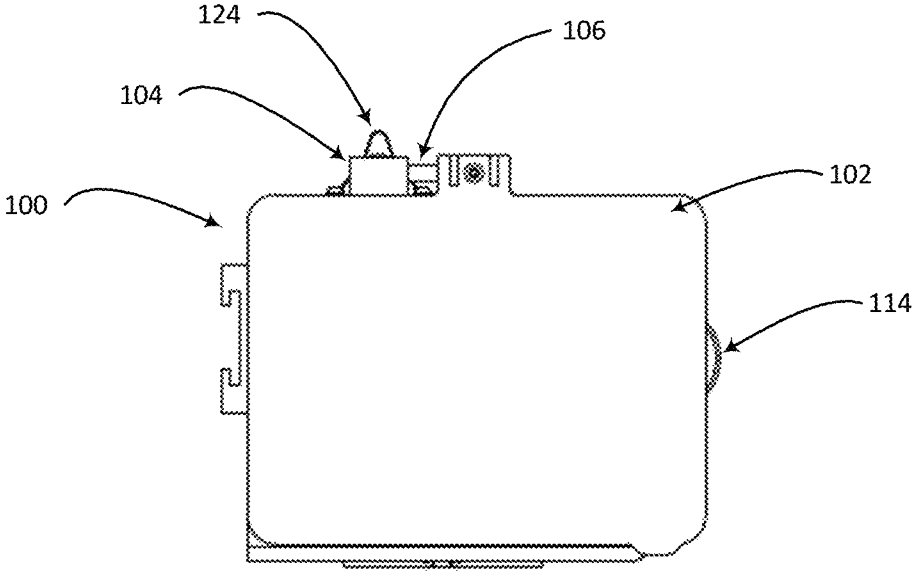

With respect to FIG. 1A, this figure illustrates a front view (looking at the side of the camera case 100 that exposes a lens of an enclosed action camera for capturing images) of the camera case 100. FIG. 1B illustrates an oblique view of the camera case 100 from a position above and to the right of the camera case. FIG. 1C illustrates an oblique view of the camera case 100 from a position below and to the left of the camera case. FIG. 1D illustrates a front view of the camera case 100 with the top flap, attached via the accessory hinge, folded down over the front of the camera case.

Turning to FIGS. 1A-1D, typically though not exclusively the camera case 100 is a molded or formed polymer construct, particularly configured to accept and protect a corresponding action camera. Examples of these corresponding action cameras include, by way of illustration and not limitation, GoPro™ action cameras, Sony™ action cameras, DJI action cameras, and the like. The camera case is formed of suitable polymers including but not limited to polyvinyl chloride (PVC), rigid nylons such as polyphthalamide (PPA), polyamine 64 (PA64) and/or polyamine 66 (PA66, also called nylon 66), acrylonitrile butadiene styrene (ABS), and the like.

According to aspects of the disclosed subject matter, a suitably configured camera case 100 includes a detachable front flap 102 that can be suitably rotated, relative to the front of the camera case, from its fully down position (see FIG. 1D showing the front flap 102 rotated fully down and protecting exposed action camera elements such as the camera lens 116 and elements exposed through the front of the case such as an accessory window 122) and rotated up above and extending behind the camera case such (where it would not provide any light shading to the camera lens) and points in between to generate shade for the camera lens, such as shown in FIGS. 1A and 1B.

Figure 2A:
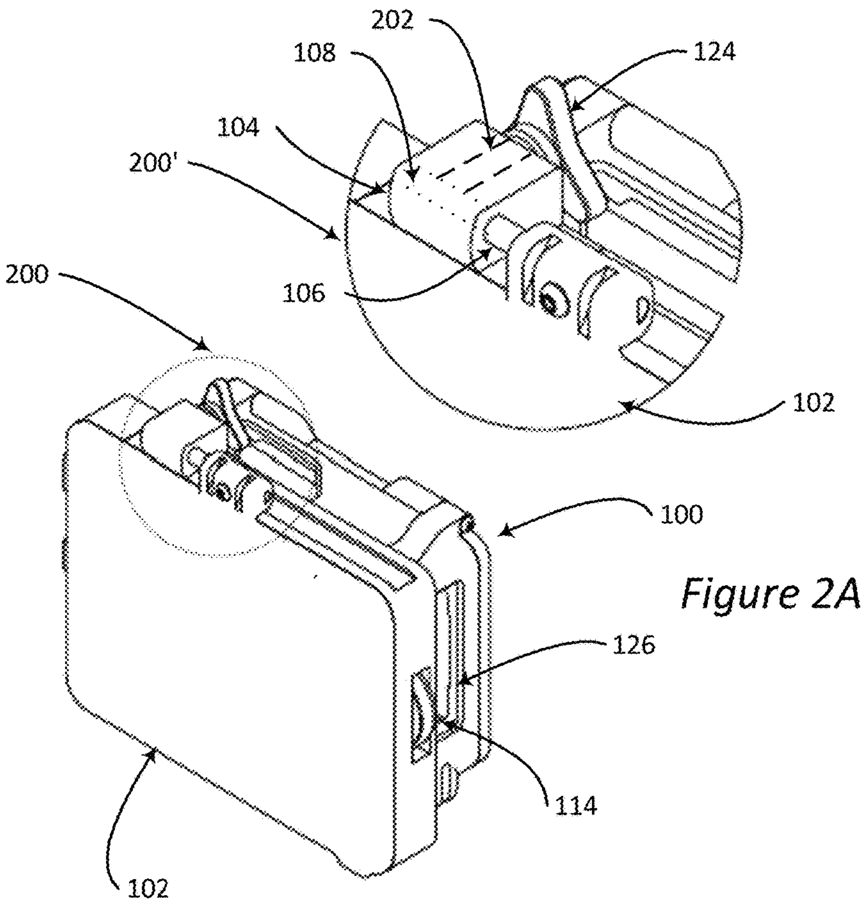
FIGS. 2A-2D illustrate various views of the camera case, configured in accordance with aspects of the disclosed subject matter.

According to various embodiments of the disclosed subject matter, the front flap 102 may be comprised of the same material (one or several polymers) of the camera case or, alternatively, be constructed of a carbon fiber material for strength and low weight. As shown in FIGS. 1A and 2A, the front flap includes a post 106 that extends through channel 108 in an accessory hinge 104 incorporated in and integral to the camera case 100. The front flap 102, or any other attached accessory using the accessory hinge 104, is user-configurably secured in place, relative to the camera case, through a securing feature, such as securing screw 104 that screws through a threaded channel 202 (see FIG. 2A) in the accessory hinge 104 and functions as a set screw to secure the position of an attached accessory or front flap 102.

Camera case 100 includes a lens opening 112 through which the camera lens 116 (often also protectively covered by a lens filter) of the encased action camera is exposed for capturing images and/or video. According to aspects of the disclosed subject matter, the lens opening is found within a filter tray 120 formed in the camera case. The filter tray is an embedded tray into which one or more filter plates (see FIGS. 4A-4C) may be added. In some embodiments, the filter tray includes an access channel 128 (area within the dashed line) where the recessed area extends completely to an edge of the camera case. This access channel facilitates user addition to and/or removal of filter plates in the filter tray.

While in at least one embodiment the filter tray is formed to a depth that accommodates a single filter plate without extending beyond the front plane of the camera case, in various alternative embodiments of the disclosed subject matter, the filter tray has a depth (relative to the front plane of the camera case) to permit at least two filter plates to be stacked in the filter tray (see FIGS. 3A-3B) without the filter plates extending beyond the front-most surface of the camera case. Advantageously, the depth of the filter tray 120 permits the user to keep multiple filter plates in the filter tray and secured while the front flap 102 is fully down and protecting action camera elements that may be otherwise exposed. Of course, a single filter plate will be secured within the filter tray, via attaching mechanisms such as magnets 110, even when the depth of the filter tray could accommodate at least two filter plates without extending beyond the front plane of the camera case. Filter plates are described in greater detail below with respect to FIGS. 3A-B and 4A-C.

As video often includes an audio component, in addition to a lens opening 112 in the filter tray 120, the filter tray (or at another location on the camera case, depending on the of the action camera) optionally includes a microphone opening 118 that is positioned with respect the action camera's microphone when enclosed in the camera case 100. Further still, according to aspects of the disclosed subject matter, the filter tray includes at least two magnets 110 (attaching mechanisms) to secure filter plates in the filter tray when added by a user. As will be discussed below in regarding FIGS. 3A-B and 4A-C, the filter plates include magnets that correspond in location to the magnets 110 in the filter tray to create a magnetic attraction to keep the filter plates from falling out of the filter tray. Advantageously, the filter tray and, correspondingly, the filter plates are shaped such that they fit together in a manner that ensures that the filter plates cannot be rotated while in the filter tray.

According to various embodiments of the disclosed subject matter, optionally incorporated in the camera case is a rotating wheel 114. The rotating wheel is of sufficient size as to provide a portion of the wheel (as shown in FIG. 1B) that can be manipulated/rotated by a user. Additionally, the rotating wheel can be configurably positioned to engage with the action camera's lens. The result is that a user's rotation of the rotating wheel causes a rotation of the camera lens (or, quite often, the camera lens and lens cover combination). As those skilled in the art will appreciate, the camera lens cover will include a filtering or effect that changes with rotation. For example, a camera lens cover may be a polarized lens cover, the rotation of which affects the amount of light that passes through to the camera's internal features. In various embodiments, the rotating wheel can be configurably positioned such that it does not engage with the action camera's lens/lens cover. The rotating wheel is connected to an engaging slide 204 (see FIG. 2B), switch or other device that allows a user to configurably connect or disconnect the engagement of the rotating wheel with the action camera's lens/lens cover.

Also optionally included in a suitably configured camera case 100 is a control window 126. As shown in FIG. 1B, as well as FIGS. 2A-B, the control window 126 is located on a surface of the camera case 100 corresponding to a location where controls of the action camera are found when the action camera is enclosed in the case. Controls such as an on/off control, volume control, flash control, and the like are often on action cameras in a common area and are made accessible while the action camera is enclosed in the case through control window 126.

Figure 1E:
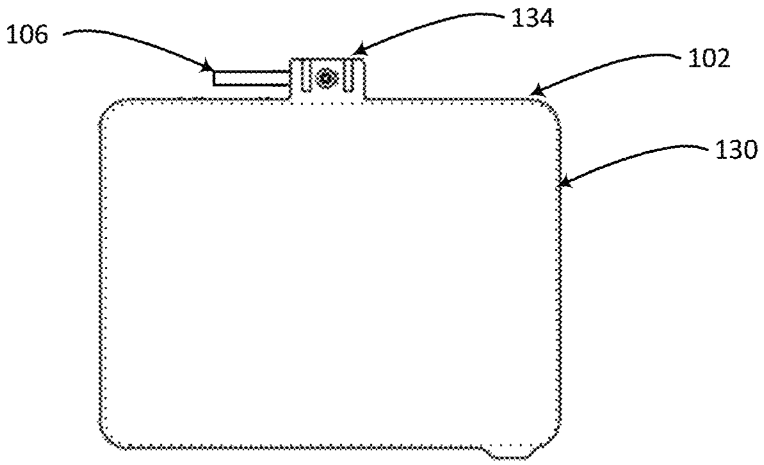

With respect to the detachable front flap 102, FIG. 1E is a view of the front flap detached from the camera case 100. As discussed above, the front flap attaches to the camera case via the front flap's post 106, which is encased in the front flap in flap extension 134. In addition to the main body 130 of the front flap 102, which generally corresponds to the shape of the front of the camera case, a tab 132 is included to facilitate user manipulation of the front flap 102.

Figure 1F:
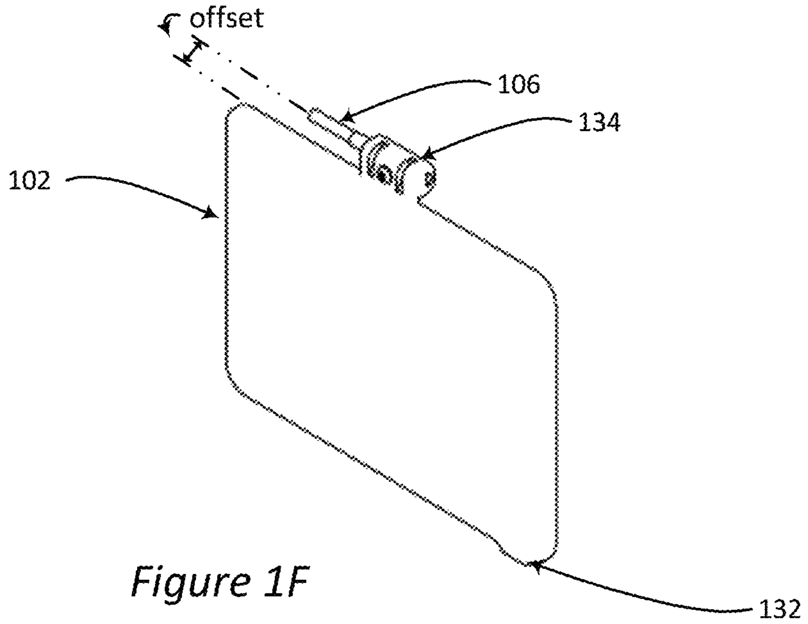

With respect to FIG. 1F, and according to various aspects of the disclosed subject matter, this figure illustrates an oblique view of front flap 102 detached from the camera case 100. In various embodiments of the disclosed subject matter, tab 132 serves to align the front flap's post 106 with channel 208 (FIG. 2A) of hinge 104, and further serves to offset the main body 130 of the front flap to a position such that the inside surface (proximate to the camera case) of main body is flush against the front plane of the camera case.

Figure 2B:
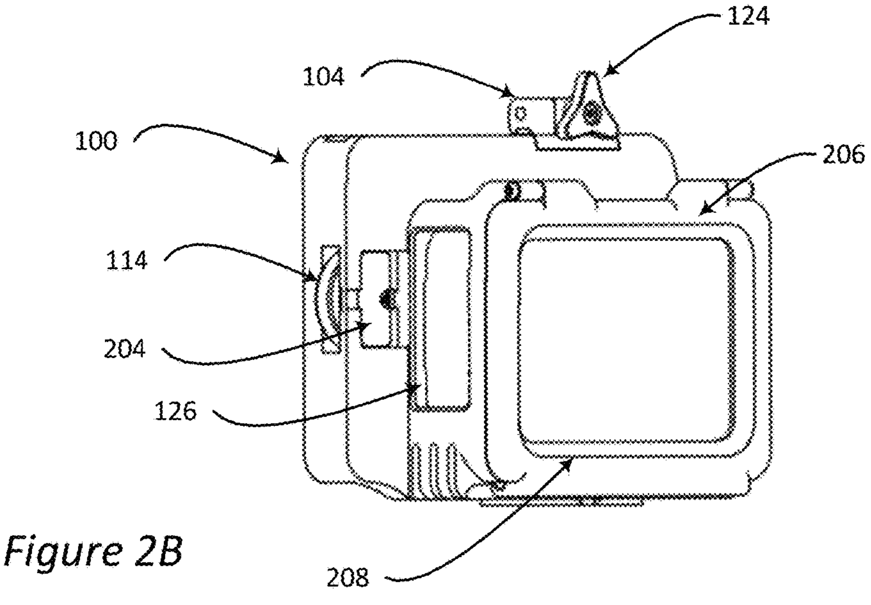

Regarding accessory hinge 104, reference is now made to FIGS. 2A-B. FIG. 2A illustrates the exemplary camera case 100 with the front flap 102 folded fully down over the front of the camera case, which provides a view 200 of the accessory hinge 104. View 200' is an enlarged view of the area covered by view 200.

As illustrated in view 200', accessory hinge 104 includes a channel 108 (as illustrated by the dotted lines) that passes laterally through the accessory hinge and parallel to plane of the front the camera case 100. This enables the front flap 102 to be rotated up and down by a user to provide shade to the encased action camera, as well as provide protection to the camera's lens and other camera features. The rotated position of the front flap is secured by the user by applying a securing element to the front flap's post 106. In various embodiments, this securing element 124 is a threaded screw, which engages with a matching threaded channel 202, with sufficient length to engage with and tighten down on the front flap's post 106. This engagement further provides protection from the front flap 102 becoming unintentionally disengaged from the accessory hinge 104. In various embodiments, the matching threaded channel 202 is a metallic channel embedded in the camera case 100.

The mounting mechanism 124, illustrates a triangular "head" that allows a user to comfortably manipulate the mechanism (a screw as illustrated). However, this shape is illustrative, and should not be viewed as limiting on the disclosed subject matter. As potential but non-limiting alternatives, the head may be rounded with serrations for a better grip, a flanged head, and the like. Of course, the mounting mechanism 124 may be comprised of a level or camming device that applies pressure on the accessory or front flap post to hold it in place and may or may not utilize a threaded channel to secure the front flap's post 106. In various embodiments, in place of a channel, the accessory hinge 104 may include a notch that allows a type of brake to prevent rotation or unintentional disengagement of the front flap. Indeed, numerous types of securing elements may be utilized to ensure that the front flap 102 (or an accessory), maintains its position and does not disengage from the camera case 100.

According to various embodiments of the disclosed subject matter, the front flap 102 may be removed and an accessory, having a post of the same dimension and size as the front flap, can be attached to the camera case. Accessories may include, by way of illustration and not limitation, a different (perhaps larger) light shade or light reflector, a flash, lighting, mounting features, a solar panel for charging, a display screen showing the view of the camera lens, and the like.

FIG. 2B provides a rear-view of camera case 100 which has a better view of the head of the securing element 124, as attached to the accessory hinge 104. Also shown in this figure is a retaining door 206 that is hinged to the camera case, closed and secured closed by one or more mechanisms of the camera case. Typically, though not exclusively, an action camera is put into the camera case 100 though an opening that is covered by the retaining door 206 when it is closed.

Depending on the configuration of the action camera, the retaining door may include a display pane 208 through which the action camera's display may be viewed. Typically, though not exclusively, display pane 208 is filled with a clear plastic panel, e.g., clear acrylic panel, that permits viewing the action camera's display while protecting the action camera (including its display) from the elements. In alternative embodiments, display pane 208 is a physical opening.

The rear view of the camera case as shown in FIG. 2B also illustrates the engaging slide 204 is attached to the rotating wheel 114 such that the rotating wheel can be engaged or disengaged from the action camera's lens (or lens and lens cover combination). By manipulating the illustrated engaging slide 204 toward the action camera, the rotating wheel 114 engages/makes contact with the camera lens. Typically, though not exclusively, the rotating wheel includes a rubber, elastic or soft polymer edge on the wheel that, when engaged with the camera lens, causes a rotation of the lens as the rotating wheel is also rotated. In alternative embodiments, a gritty or serrated edge on the rotating wheel may be used. When the engaging slide 204 is moved away from the camera lens, the rotating wheel 114 disengages from the camera lens. This disengagement ensures that the rotational position of the camera lens is not unintentionally altered by accidentally rotating the rotating wheel.

Figure 2C:
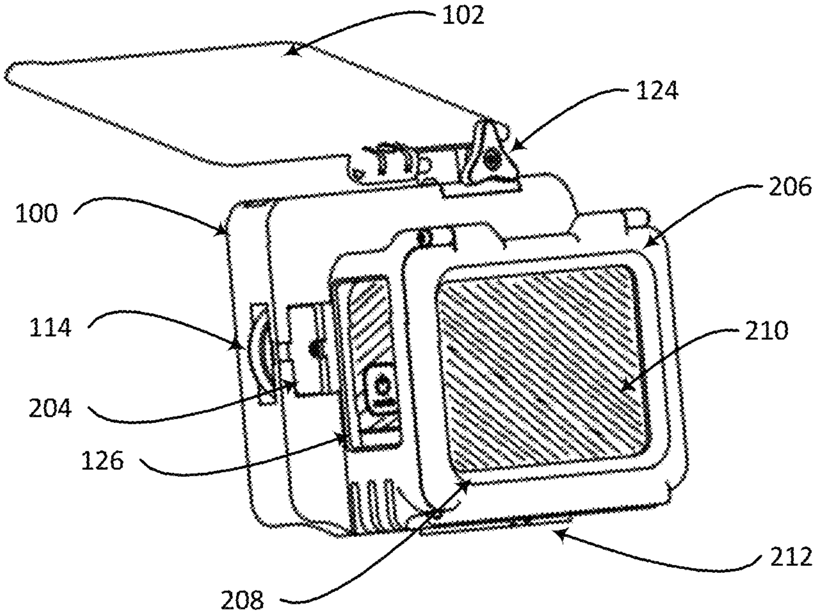

FIG. 2C provides an oblique rear-view of camera case 100 which includes an action camera 210 (shaded) inserted into the camera case. As can be seen, the action camera is secured within camera case 100 with the retaining door 206 closed and secured through a latching mechanism 212 formed into the camera case 100. Viewing or physical access to a back portion of the action camera (typically, though not exclusively a charged-coupled device (CCD) display) is made via display pane 208. Similarly, physical access to one or more user-manipulable controls of the action camera may be made via control window 126, such as a power button as shown in FIG. 2C.

Figure 2D:
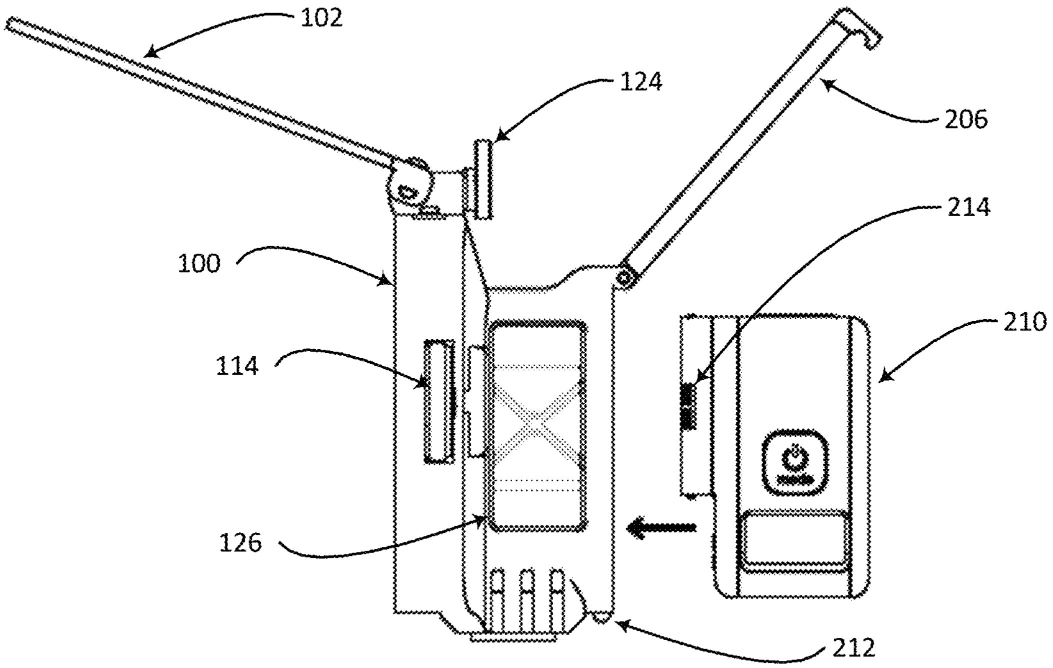

FIG. 2D provides a side view of camera case 100 to illustrate the insertion of an action camera 210 into the camera case. In this illustration, retaining door 206 is open for permitting insertion of the action camera. Further shown, the action camera's lens 214 is found on a front portion of the action camera. As discussed above, the position of the action camera's lens 214, when inserted into the camera case, coincides with the lens opening 112 in the filter tray 120. Moreover, when the action camera 210 is fully inserted into the camera case, and the rotating wheel is engaged, the rotating wheel and the action camera's lens 214 are in contact such that rotation of the rotating wheel causes a rotation in the action camera's lens.

Figure 3A:
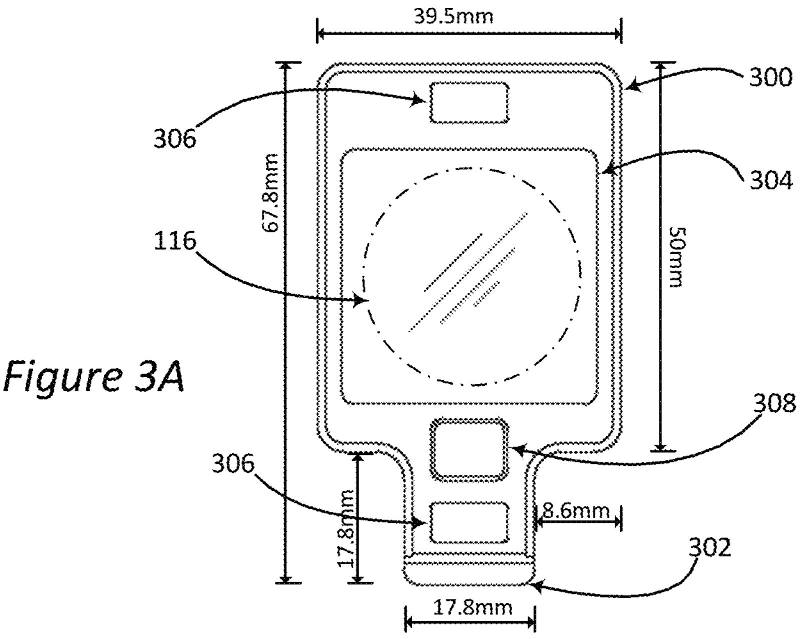
FIGS. 3A-3C illustrate various views of an exemplary filter plate, formed in accordance with aspects of the disclosed subject matter.
Figure 3B:
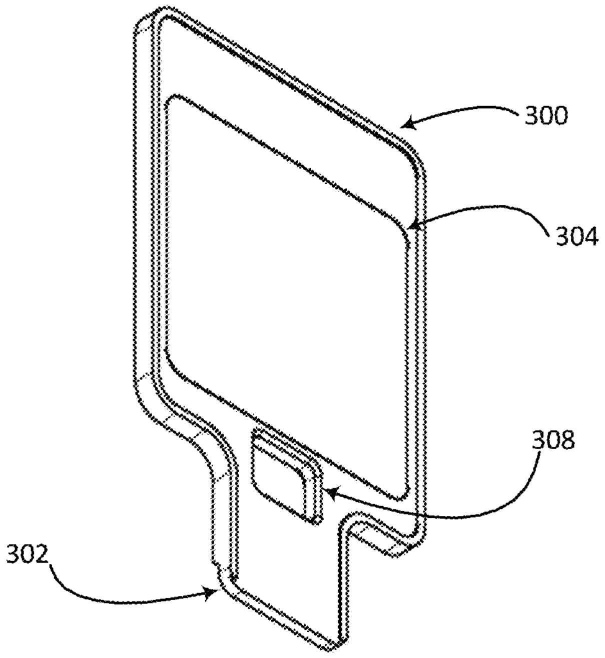
Figure 3C:
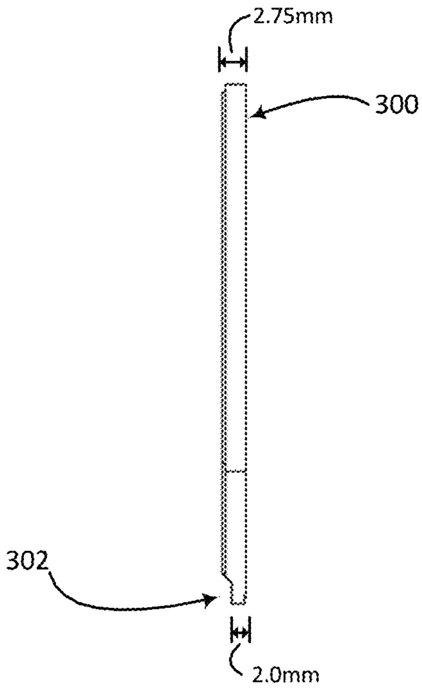

Turning now to FIGS. 3A-C, these figures illustrate an exemplary filter plate 300 as may be utilized by the camera case 100 described above. FIG. 3A illustrates a view of the attachment side of filter plate 300, where the "attachment side" means the side of the plate facing the filter tray 120 and the action camera's lens, and which side engages camera case 100 to keep the filter plate 300 in place.

As illustrated in FIGS. 3A and 3B, the filter plate 300 includes a filter pane 304 through which a camera lens 116 (with or without a lens cover) captures images and/or videos. According to aspects of the disclosed subject matter, the filter pane is an optical pane that filters and/or provides optical effects in capturing images. Filter panes may be comprised of glass or polymer. By way of illustration and not limitation, filter panes may comprise a polarized filter, a neutral density filter, an optical distortion, and the like. Optimally, though not exclusively, filter pane 304 is positioned in the filter plate such that the action camera's lens 116 is centered within the filter pane, as shown in FIG. 3A. Advantageously, by centering the filter pane with an action camera's lens, filtering and effects that include a center position are aligned with the lens.

Regarding the dimensions of the filter plates (which correspond closely to dimensions of the filter tray, e.g., up to 1.5 mm on each dimension to allow inserting and removing filter plates), in various embodiments and as shown in FIG. 3A, the overall height of filter plates is 67.8 mm with a width of 39.5 mm. Channel 120 is centered on the horizontal axis of the filter plate and is ~17.8 mm high and wide. Of course, the illustrated configuration is just one configuration of a filter plate, that there are numerous other configurations, including circular shapes, etc., as well as simple alterations to the dimensions of the illustrated filter plate, that would allow the addition of a filter plate to the camera case that are viewed as part of the disclosed subject matter, and the illustrated configuration is not constrained or limited to this configuration. Advantageously, however, the illustrated configuration is well suited to allow camera users to provide filter and effect solutions, in the form of filter plates, to an action camera.

As suggested above, filter pane 300 is a pane through which the action camera's lens captures images and videos. Optical filters and or effects are typically, though not exclusively, incorporated within the filter pane. These optical filters and effects may include, by way of illustration and not limitation, color filters, polarizing filters, blurrings, patterns, distortions, and the like.

In addition to the filter pane 304, filter plate 300 includes an engagement mechanism to secure the plate to the camera case. While in various embodiments of the disclosed subject matter the engagement mechanism may comprise any of clips, catches, and the like, in many embodiments and as illustrated in FIG. 3A, magnets such as magnets 306 may be used to secure the filter plate to the camera case 100. These magnets are positioned on the filter plate to correspond to the magnets 110 in the filter tray 120, though the polarity of magnets 306 are arranged such that they form a strong attraction to magnets 110 in the filter tray.

As illustrated in FIGS. 1A and 1*n* FIG. 3A, in various embodiments of the disclosed subject matter at least two magnets are used: a magnet positioned "above" the filter pane and one magnet positioned "below" the filter pane, which correspond to magnets and their position in the filter tray (see FIG. 1A). Of course, in alternative embodiments, additional magnets and/or magnet arrangements may be utilized. Of importance is that the magnets in the filter plate correspond and can form a bond with magnets in the filter tray, and that they do not interfere with the area corresponding to the action camera's lens. In various embodiments of the disclosed subject matter, the magnets are neodymium magnets, or other rare earth magnets.

Figure 4A:
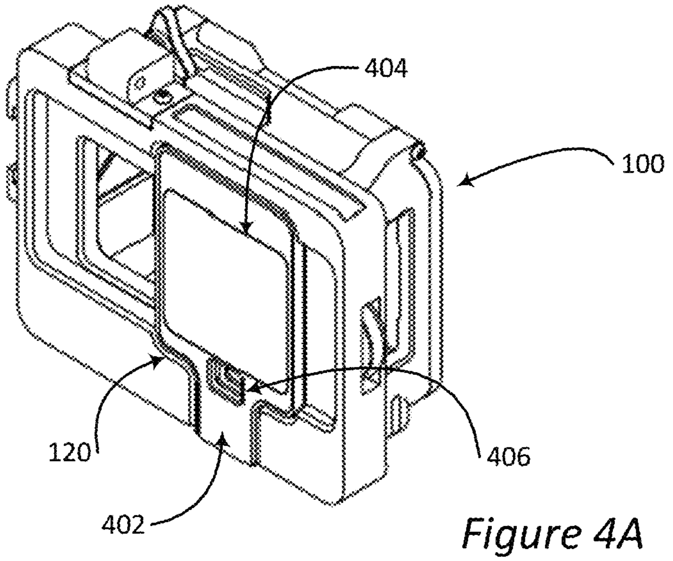
FIGS. 4A and 4B illustrate front views of the camera case containing a plurality of filter plates in the filter tray, in accordance with aspects of the disclosed subject matter.
Figure 4B:
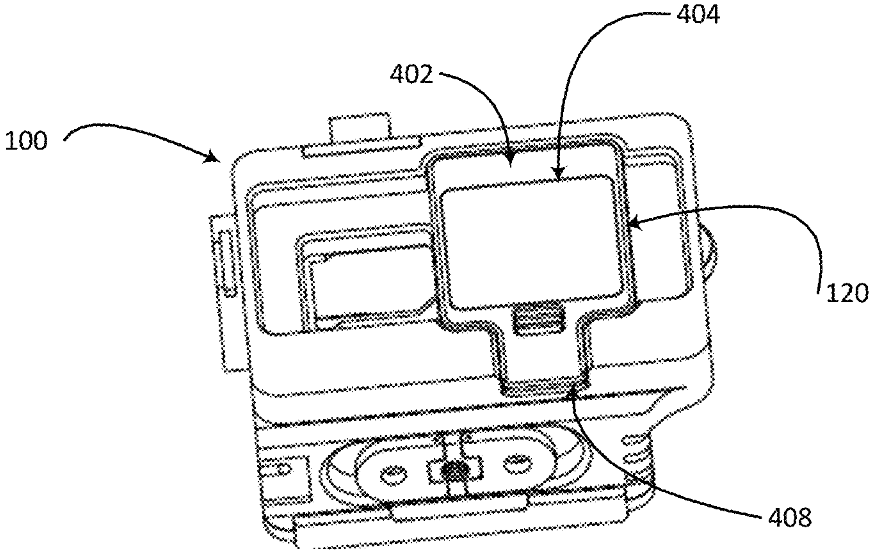

A microphone opening 308 is typically, though not exclusively, included in the filter plate 300. This microphone panel 308 corresponds to the microphone opening 118 in the filter tray 120 which, in turn, corresponds to the area of the action camera for capturing sounds/audio. As filter plates may be stacked to create more complex filter/effect combinations, the filter plate also includes a plate notch 302 at the "bottom" of the filter plate. This notch facilitates removal of the filter plate from the filter tray. FIG. 4B illustrates a front view of a camera case 100 into which a plurality of filter plates, including filter plate 400, have been added. Filter plate 400 includes plate notch 408 to facilitate the removal of the filter plate from the filter tray.

As suggested above and according to aspects of the disclosed subject matter, in some embodiments filter plates may be stacked and remain in position, relative to the camera lens, due to magnetic bonds that align with other filter plates and the magnets in the filter tray. Additionally, though not exclusively, the filter tray 120 has enough depth that at least two filter plates can be stacked onto the camera case without the top-most filter plate rising above the front-most surface of the camera case, as shown in FIGS. 4A and 4B. Advantageously, this allows the front flap 102, when rotated down against the front of the camera case, to enclose and protect at least two filter plates stacked in the filter tray.

With reference to FIG. 3B, this illustrates an oblique view of the "stacking side" of filter place 300. This is the side of a filter plate on which another filter plate is placed. Similarly, with reference to FIG. 3C, this figure illustrates a side view of filter plate 300. In this side view, an exemplary but not limiting thickness of the filter plates is shown, i.e., ~2.75 mm thick (where "~" indicates up to a +/−0.07 mm variance), with a ~1.0 mm notch 302 at the bottom. Using this exemplary thickness, a suitably configured filter tray 120 may have a depth (from the front plane of the camera case) of ~5.5 mm. Of course, in alternative embodiments, filter plates may be thicker or thinner, with a depth of the filter tray 120 correspondingly deeper or shallower. Further still, while the "standard" filter tray may have a depth to accommodate two "standard" filter plates, this does not preclude accommodating a single filter plate with a significantly larger thickness, or three or more filter plates that have significantly smaller thicknesses.

Regarding FIG. 4A, this figure illustrates an oblique view, above and from the right of the front of the camera case 100, in which a plurality of filter plates (including filter plate 402) have been stacked in the filter tray. As discussed with respect to filter plates in describing FIGS. 3A-C. This oblique front view of filter plate 402 shows the filter pane 404 which is optimally centered over the action camera's lens, and further illustrates a microphone opening 406.

FIG. 4B illustrates an oblique view, below and slightly from the left of the front of the camera case 100, showing the same plurality of filter plates (including filter plate 402) have been stacked in the filter tray as demonstrated in FIG. 4A. Additionally, with this particular view, the plate notches, including plate notch 408 of filter plate 402, are visible.

While various novel aspects of the disclosed subject matter have been described, it should be appreciated that these aspects are exemplary and should not be construed as limiting unless explicitly identified as such. Variations and alterations to the various aspects may be made without departing from the scope of the disclosed subject matter.

The invention claimed is:

1. A camera case suitable for enclosing an action camera, wherein:

the camera case is formed with an interior space configured to closely accommodate a corresponding action camera;

a filter tray recessed in a front plane of the camera case, wherein:

the filter tray includes a lens opening in base of filter tray, the lens opening being of sufficient area to provide an opening for the action camera's lens, and wherein the lens opening is centered over the action camera's lens when the action camera is fully inserted within the camera case;

the filter tray includes a filter plate attaching mechanism for securing one or more filter plates stacked within the filter tray, wherein the top surface of the attaching mechanism is flush with the base of the filter tray; and the filter tray includes an access channel to an edge plane of the front of the camera case to facilitate removal of the one or more filter plates stacked within the filter tray; and a rotating wheel that can be engaged with the action camera's lens to facilitate the rotation of the action camera's lens through rotation of the rotating wheel or disengaged from the action camera's lens to prevent undesired rotation of the action camera's lens.

2. The camera case of claim 1, wherein the filter tray includes at least two attaching mechanisms, including a first attaching mechanism at a position above the lens opening and a second attaching mechanism at a position below the lens opening.

3. The camera case of claim 2, wherein each attaching mechanism comprises a magnet that magnetically attracts to a corresponding magnet in a filter plate to secure the filter plate in the filter tray.

4. The camera case of claim 1, wherein the filter tray is recessed to a depth that permits at least two filter plates to be placed in the filter tray without extending above the front plane of the camera case.

5. The camera case of claim 4, wherein the filter tray is recessed to a depth, from the front plane of the camera case, of at least 2.75 mm.

6. The camera case of claim 1, wherein the filter tray further includes a microphone opening in the base of the filter tray to provide an opening in the case for a microphone of the action camera.

7. The camera case of claim 1, wherein:

the camera case includes an accessory hinge integrated in the camera case at a top surface of the camera case, the accessory hinge suitably configured to allow the attachment of an accessory; and the camera case includes a detachable front flap that can be positioned to be flush against the surface of the camera case and completely cover the front surface of the camera case.

8. The camera case of claim 7, wherein the front flap is detachably connected to the camera case via the accessory hinge.

9. The camera case of claim 8, wherein the accessory hinge includes a securing element that secures an attachment or the front flap from being unintentionally detached from the camera case.

10. The camera case of claim 8, wherein the camera case includes a retaining door at the back of the camera case, wherein the retaining door can be positioned to allow the insertion of an action camera, and further positioned and secured to prevent unintentional removal of the action camera from the camera case.

11. The camera case of claim 10, wherein the retaining door includes a display pane that permits viewing of a back surface of the action camera.

12. A camera case suitable for enclosing an action camera, wherein:

the camera case is formed with an interior space configured to closely accommodate a corresponding action camera;

a filter tray recessed in a front plane of the camera case, wherein:

the filter tray includes a lens opening in base of filter tray, the lens opening being of sufficient area to provide an opening for the action camera's lens, and wherein the lens opening is centered over the action camera's lens when the action camera is fully inserted within the camera case;

the filter tray includes a filter plate attaching mechanism for securing one or more filter plates stacked within the filter tray, wherein the top surface of the attaching mechanism is flush with the base of the filter tray; and the filter tray includes an access channel to an edge plane of the front of the camera case to facilitate removal of the one or more filter plates stacked within the filter tray;

a retaining door on a back side of the camera case, wherein the retaining door can be opened to allow the insertion of an action camera, and further closed and secured to prevent unintentional removal of the action camera from the camera case; and an accessory hinge integrated in the camera case at a top surface of the camera case, the accessory hinge suitably configured to allow the attachment of an accessory.

13. The camera case of claim 12, wherein the accessory hinge includes a securing element that secures an attachment from being unintentionally detached from the camera case.

14. The camera case of claim 13, wherein the camera case includes a detachable front flap that, when attached to the camera case via the accessory hinge, can be configurably positioned to be flush against the surface of the camera case and completely cover the front surface of the camera case.

15. The camera case of claim 12, wherein the retaining door includes a rotating wheel that can be engaged with the action camera's lens to facilitate the rotation of the action camera's lens through rotation of the rotating wheel or disengaged from the action camera's lens to prevent undesired rotation of the action camera's lens.

16. A camera case suitable for enclosing an action camera, wherein:

the camera case is formed with an interior space configured to closely accommodate a corresponding action camera;

a filter tray recessed in a front plane of the camera case, wherein:

the filter tray includes a lens opening in base of filter tray, the lens opening being of sufficient area to provide an opening for the action camera's lens, and wherein the lens opening is centered over the action camera's lens when the action camera is fully inserted within the camera case;

the filter tray includes a filter plate attaching mechanism for securing one or more filter plates stacked within the filter tray, wherein the top surface of the attaching mechanism is flush with the base of the filter tray; and the filter tray includes an access channel to an edge plane of the front of the camera case to facilitate removal of the one or more filter plates stacked within the filter tray;

a retaining door on a back side of the camera case, wherein the retaining door can be opened to allow the insertion of an action camera, and further closed and secured to prevent unintentional removal of the action camera from the camera case; and an accessory hinge integrated in the camera case at a top surface of the camera case, the accessory hinge suitably configured to allow the attachment of an accessory a detachable front flap that, when attached to the camera case via the accessory hinge, can be configurably positioned to be flush against the surface of the camera case and completely cover the front surface of the camera case; and a rotating wheel that can be engaged with the action camera's lens to facilitate the rotation of the action camera's lens through rotation of the rotating wheel or disengaged from the action camera's lens to prevent undesired rotation of the action camera's lens.

17. The camera case of claim 16, wherein the accessory hinge includes a securing element that impinges on a metal attaching post of a suitably configured attachment or the front flap, wherein the impingement ensures positioning of an attached accessory or front flag and prevents unintentional detachment of an attached accessory or front flap.

18. The camera case of claim 16, wherein the retaining door includes a display pane that permits viewing of a back surface of the action camera.

19. The camera case of claim 18, wherein the display pane is comprised of a clear material through which the back surface of the action camera can be viewed.

20. The camera case of claim 16 further including a control window on a side of the camera case that is positioned to provide access to one or more user-manipulable controls on the action camera.

* * * * *